US012730181B2

(12) United States Patent
Yoshihara et al.

(10) Patent No.: US 12,730,181 B2
(45) Date of Patent: Sep. 8, 2026

(54) UNDERWATER POSITIONING SYSTEM AND METHOD

(71) Applicants: AOMI CONSTRUCTION CO., LTD, Tokyo (JP); UNIVERSITY OF TSUKUBA, Tsukuba (JP)

(72) Inventors: Tohru Yoshihara, Tokyo (JP); Tadashi Ebihara, Tsukuba (JP); Koichi Mizutani, Tsukuba (JP)

(73) Assignee: AOMI CONSTRUCTION CO., LTD., Tokyo (JP)

(*) Notice: Subject to any disclaimer, the term of this patent is extended or adjusted under 35 U.S.C. 154(b) by 135 days.

(21) Appl. No.: 18/290,796

(22) PCT Filed: Jul. 15, 2022

(86) PCT No.: PCT/JP2022/027854

§ 371 (c)(1),
(2) Date: Jan. 21, 2024

(87) PCT Pub. No.: WO2023/008230

PCT Pub. Date: Feb. 2, 2023

(65) Prior Publication Data

US 2025/0093459 A1 Mar. 20, 2025

(30) Foreign Application Priority Data

Jul. 30, 2021 (JP) ................................ 2021-125104

(51) Int. Cl.
*G01S 5/26* (2006.01)

(52) U.S. Cl.
CPC ..................................... *G01S 5/26* (2013.01)

(58) Field of Classification Search
CPC ..... G01S 5/18; G01S 5/22; G01S 5/30; G01S 5/26; G01S 1/76; G01S 7/526

(Continued)

(56) References Cited

U.S. PATENT DOCUMENTS 8,644,113 B2 * 2/2014 Harrell ...................... G01S 5/26 367/118
2005/0099891 A1 * 5/2005 Protoolis .................. G01S 5/30 367/118

(Continued)

FOREIGN PATENT DOCUMENTS

| | | |
|---|---|---|
| JP | H07116162 | 5/1995 |
| JP | 2013024647 | 2/2013 |

(Continued)

OTHER PUBLICATIONS

Shirai et al. ("Development of underwater ultrasonic positioning system for construction machines." Proceedings of the 2004 International Symposium on Underwater Technology (IEEE Cat. No. 04EX869). IEEE, 2004., "Shirai") (Year: 2004).*

(Continued)

*Primary Examiner* — Yuqing Xiao
*Assistant Examiner* — Christopher Richard Walker
(74) *Attorney, Agent, or Firm* — Fattibene and Fattibene, LLC; Paul A. Fattibene

(57) ABSTRACT

An underwater positioning system for accurate underwater positioning. At least one among at least one acoustic transmitter and at least one hydrophone is provided at known coordinates and which positions an unknown point having unknown coordinates at which another acoustic transmitter or hydrophone is provided, includes a time window that stores in advance, when the unknown point is set in a plurality of regions set by dividing an underwater positioning range, a time window for a sound wave emitted from the acoustic transmitter to reach the hydrophone for each of the regions, and a coordinate estimation and specification unit that calculates for each of the regions a time window-applied impulse response as an inner product of the time window and an impulse response of a sound wave propagation path from the acoustic transmitter to the hydrophone and esti- (Continued)

mates that the unknown point is located in the region where the energy of the time window-applied impulse response is maximized.

12 Claims, 12 Drawing Sheets

(58) Field of Classification Search
USPC .......................................................... 367/131
See application file for complete search history.

(56) References Cited

U.S. PATENT DOCUMENTS

| | | | |
|---|---|---|---|
| 2006/0140054 A1 | 6/2006 | Intrator et al. ................ | 367/135 |
| 2013/0083631 A1 | 4/2013 | Harrell et al. ................ | 367/127 |

FOREIGN PATENT DOCUMENTS

| | | |
|---|---|---|
| JP | 2014531597 | 11/2014 |
| JP | 2018204970 | 12/2018 |
| WO | WO2020003459 | 12/2020 |

OTHER PUBLICATIONS

Dubrovinskaya et al. ("Anchorless underwater acoustic localization." 2017 14th Workshop on Positioning, Navigation and Communications (WPNC). IEEE, 2017., "Dubrovinskaya") (Year: 2017).*
Vio et al. ("Near real-time improved UUV positioning through channel estimation—the unscented Kalman filter approach." Oceans 2016 MTS/IEEE Monterey. IEEE, 2016., "Vio") (Year: 2016).*
International Search Report, PCT/JP2022/027854, dated Aug. 30, 2022, 2 pages.

* cited by examiner $$\tilde{r}^{\{i,j,n\}}(t) = \begin{cases} 1 & \left(t_{min}^{\{i,j,n\}} \le t \le t_{max}^{\{i,j,n\}}\right) \\ 0 & (\text{otherwise}) \end{cases}$$

UNDERWATER POSITIONING SYSTEM AND METHOD

TECHNICAL FIELD

The present invention relates to an underwater positioning system and method.

BACKGROUND ART

Conventionally, an underwater positioning of a heavy machine such as a backhoe or a bulldozer or a structure such as a submerged box that performs work in water or on a water bottom has been performed.

For example, Patent Literature 1 discloses an underwater acoustic positioning system including an acoustic transmitter installed at known coordinates, a hydrophone installed in a backhoe, a signal generation unit connected to the acoustic transmitter, a D/A converter, an amplifier and a GNSS antenna, and a control device that periodically estimates coordinates of the backhoe on the basis of a propagation time of a sound wave from the acoustic transmitter to the hydrophone.

CITATION LIST

Patent Literature

Patent Literature 1: Japanese Patent Laid-Open No. 2018-204970

SUMMARY OF INVENTION

Technical Problem

However, in the system described in Patent Literature 1, the sound wave emitted from the acoustic transmitter to reach the hydrophone includes a sound wave reflected by a water surface, a water bottom, or a structure (reflected wave) and a sound wave diffracted by a water bottom or a structure (diffracted wave) in addition to a sound wave that propagates straight toward the hydrophone from the acoustic transmitter (direct wave), as illustrated in FIG. 14.

Therefore, even if an attempt to individually calculate an impulse response of a propagation path between the acoustic transmitter and the hydrophone and estimate coordinates of the acoustic transmitter using its peak reach time period as a direct wave reach time period is made, as illustrated in FIG. 15, the direct wave, the reflected wave, and the diffracted wave interfere with each other and are received by the hydrophone. Accordingly, a reach time period of the direct wave may not be able to be accurately calculated by only individually calculating a peak reach time period of each impulse response, and a large error may occur or missing may occur in a position estimation result of the hydrophone.

Therefore, there occurs a technical problem to be solved to accurately perform underwater positioning, and the present invention has its object to solve this problem.

Solution to Problem

To attain the above-described object, an underwater positioning system according to the present invention is an underwater positioning system, in which at least one among at least one acoustic transmitter and at least one hydrophone is provided at known coordinates and which positions an unknown point having unknown coordinates at which another acoustic transmitter or hydrophone is provided, including a database that stores in advance, when the unknown point is set in a plurality of regions set by dividing an underwater positioning range, a time window for a sound wave emitted from the acoustic transmitter to reach the hydrophone for each of the regions, and a coordinate estimation unit that calculates for each of the regions a time window-applied impulse response as an inner product of the time window and an impulse response of a sound wave propagation path from the acoustic transmitter to the hydrophone and estimates that the unknown point is located in the region where the energy of the time window-applied impulse response is maximized.

This configuration makes it possible to estimate the region where the acoustic transmitter or the hydrophone provided at the unknown point is located with high accuracy by taking the inner product of the impulse response and the time window to exclude the unintended sound wave included in the impulse response and comparing for the regions the magnitudes of the total energies of the time window-applied impulse responses.

To attain the above-described object, an underwater positioning method according to the present invention is an underwater positioning method, in which at least one among at least one acoustic transmitter and at least one hydrophone is provided at known coordinates and which positions an unknown point having unknown coordinates at which another acoustic transmitter or hydrophone is provided, including the step of storing in advance, when the unknown point is set in a plurality of regions set by dividing an underwater positioning range, a time window for a sound wave emitted from the acoustic transmitter to reach the hydrophone in a database for each of the regions, the step of the hydrophone receiving the sound wave emitted from the acoustic transmitter, and the step of a coordinate estimation unit calculating for each of the regions a time window-applied impulse response as an inner product of the time window and an impulse response of a sound wave propagation path from the acoustic transmitter to the hydrophone and estimating that the unknown point is located in the region where the energy of the time window-applied impulse response is maximized.

This configuration makes it possible to estimate the region where the acoustic transmitter or the hydrophone provided at the unknown point is located with high accuracy by taking the inner product of the impulse response and the time window to exclude the unintended sound wave included in the impulse response and comparing for the regions the magnitudes of the total energies of the time window-applied impulse responses.

Advantageous Effect of Invention

According to the present invention, an underwater position of an acoustic transmitter or a hydrophone provided at an unknown point can be accurately determined.

DESCRIPTION OF EMBODIMENT

Figure 1:
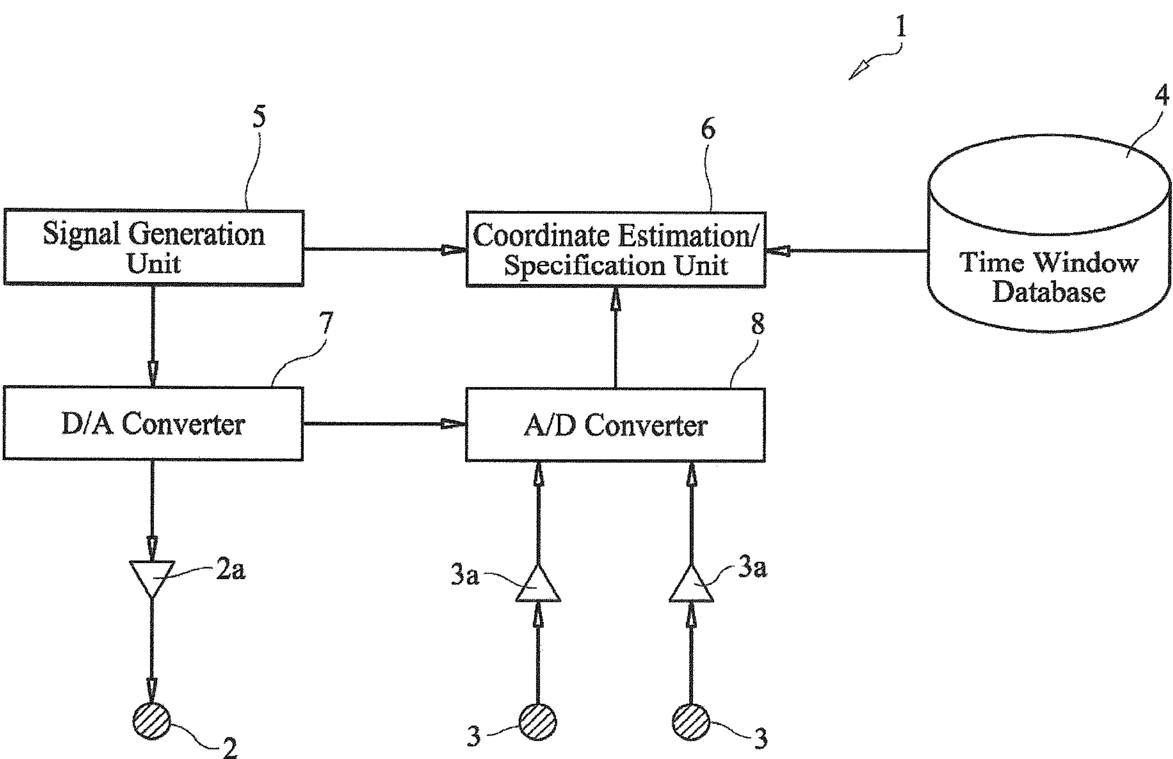
FIG. 1 is a diagram illustrating a configuration of an underwater positioning system according to a first embodiment of the present invention.

Various embodiments of the present invention will be described with reference to the drawings. Hereinafter, when reference is made to the number of components or a numerical value, amount, range, or the like of each of the components, the number or the like is not limited to a particular number but may be the particular number or more or the particular number or less unless otherwise stated or except when expressly limited to the particular number in principle.

When reference to a shape of each of components and a positional relationship among the components, a substantially approximate or similar shape or the like is included unless otherwise stated or except when considered to be expressly excluded in principle.

In the drawings, there is a case where characteristic portions are exaggerated by being enlarged, for example, in order to facilitate the understanding of features, and a dimension ratio or the like of each of the components is not necessarily the same as an actual one. In a cross-sectional view, hatching of some of the components may be omitted in order to facilitate the understanding of a cross-sectional structure of the components.

First Embodiment

FIG. 1 is a schematic view illustrating an underwater positioning system according to a first embodiment of the present invention. The underwater positioning system 1 acquires an underwater position of a heavy machine such as a backhoe or a bulldozer or a structure such as a submerged box, which is located underwater.

The underwater positioning system 1 includes an acoustic transmitter 2, two hydrophones 3, and a time window DB 4.

The acoustic transmitter 2 is attached to the heavy machine, the structure, or the like to transmit a sound wave. The hydrophone 3 receives the sound wave emitted from the acoustic transmitter 2. Respective times of the acoustic transmitter 2 and the hydrophone 3 are synchronized with each other in advance. In the present embodiment, a case where the two hydrophones 3 are respectively provided at known points each having known coordinates to position coordinates of the one acoustic transmitter 2 arranged at an unknown point having unknown coordinates will be described as an example. The time window DB 4 stores in advance a time window described below.

The underwater positioning system 1 includes a signal generation unit 5 and a coordinate estimation and specification unit 6. The signal generation unit 5 generates a signal to be used for underwater positioning. The generated signal is transmitted as a sound wave from the acoustic transmitter 2 via a D/A converter 7 and an amplifier 2*a*.

The coordinate estimation and specification unit 6 globally estimates an underwater position of the acoustic transmitter 2 on the basis of a signal received as a sound wave by each of the hydrophones 3 and recorded in an A/D converter 8 via an amplifier 3*a*. The coordinate estimation and specification unit 6 specifies coordinates of the acoustic transmitter 2 on the basis of the estimated rough position of the acoustic transmitter 2. The coordinate estimation and specification unit 6 may divide a function of globally estimating the underwater position of the acoustic transmitter 2 and a function of specifying the coordinates of the acoustic transmitter 2, as needed.

The type of the signal may be any type if it is adapted to a cross-correlation function operation (pulse compression processing) of a signal to be inputted to the acoustic transmitter 2 and a signal received by each of the hydrophones 3. Examples can include an M-sequence modulated signal, a TSP (time stretched pulse) signal, a chirp signal (a sweep signal, an LFM signal), a tone burst signal, a pulse signal, and a random noise signal. Particularly, the chirp signal is suitable for pulse compression processing because it is high in energy and is not easily affected by noise. The M-sequence modulated signal is suitable for a case where underwater positioning of a plurality of acoustic transmitters 2 and hydrophones 3 is performed in addition to being suitable for pulse compression processing.

Various types of equipment constituting the underwater positioning system 1 are controlled to operate by a computer not illustrated. The computer is configured to include a communication interface, a memory, a processor, and a time measurement mechanism, for example.

The communication interface is a wireless or wired communication circuit, for example, and connects the computer and the various types of equipment constituting the underwater positioning system 1 to be communicable with each other. Examples of the memory include a ROM that holds in advance a control program and data and a RAM that stores data or the like when executing the control program. The processor executes the control program stored in the memory, thereby controlling the communication interface or the like to perform various types of processing. Examples of the time measurement mechanism is a clock. The computer may include a display device and an input device as a user interface.

The computer may receive information required for underwear positioning from an external server device, for example, by communicating with the server device via the communication interface, or may receive input by a user of the required information via the input device.

<Procedure for Underwater Positioning>

Figure 2A:
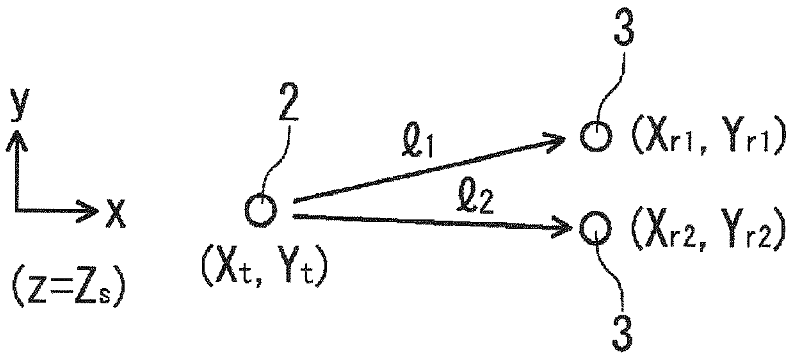
FIG. 2(*a*) is a schematic view illustrating a positional relationship between an acoustic transmitter and hydrophones, and FIG. 2(*b*) is a schematic view illustrating a procedure for estimating and specifying a position of the acoustic transmitter.
Figure 2B:
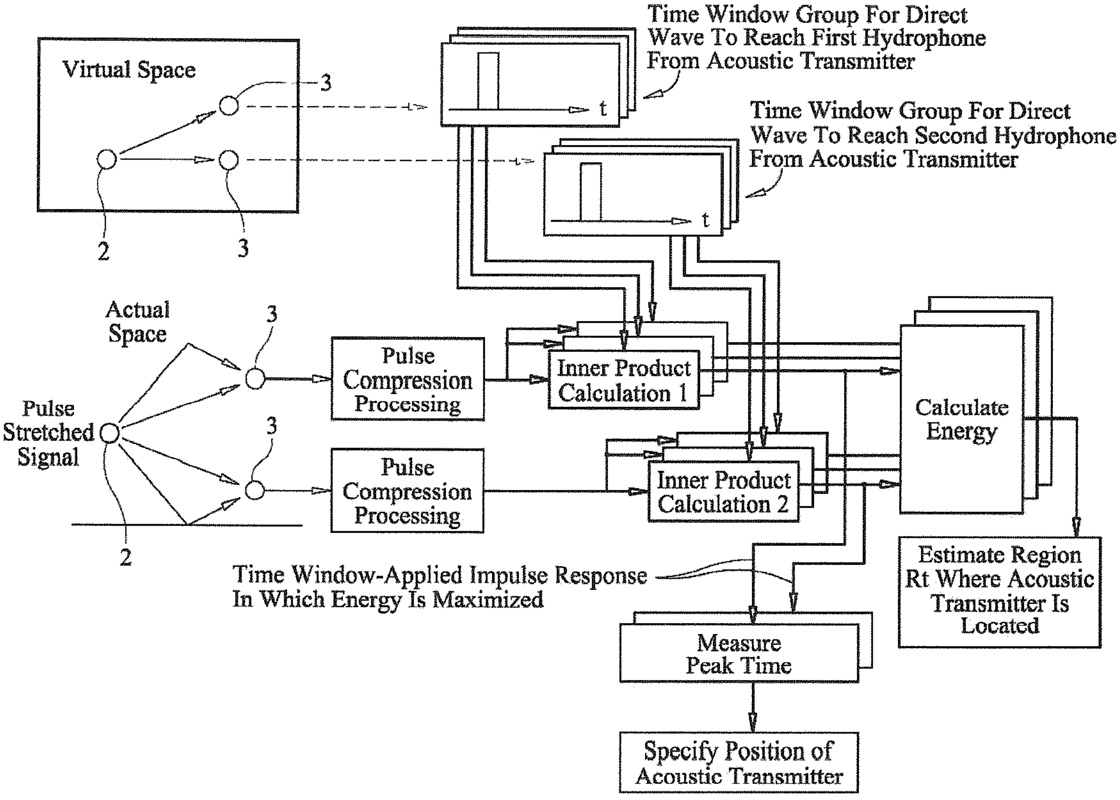

Then, a procedure for estimating an underwater position of the acoustic transmitter 2 using the underwater positioning system 1 will be described with reference to the drawings. FIG. 2(*a*) is a schematic view illustrating a positional relationship between the acoustic transmitter 2 and the hydrophones 3 in the present embodiment, and FIG. 2(*b*) is a schematic view illustrating a procedure for estimating the underwater position of the acoustic transmitter 2. Although a case where the acoustic transmitter 2 and the hydrophones 3 are arranged on the same xy plane (z=Zs is constant) will be described below as an example for convenience of illustration, the acoustic transmitter 2 and the hydrophones 3 may be respectively arranged at different z coordinates.

<Simulation Phase>

First, in a sound field where a field water area where the acoustic transmitter 2 and the hydrophones 3 are actually installed is reproduced on the basis of geographical information or the like on a calculator (virtual space) not illustrated, when it is assumed that the acoustic transmitter 2 exists in a plurality of unknown point existence candidate regions (hereinafter merely referred to as "regions") set by dividing an underwater positioning range, respective time windows until a sound wave reaches the hydrophones 3 from the acoustic transmitter 2 are calculated, and each of the time windows is stored in the time window DB 4.

Figure 3:
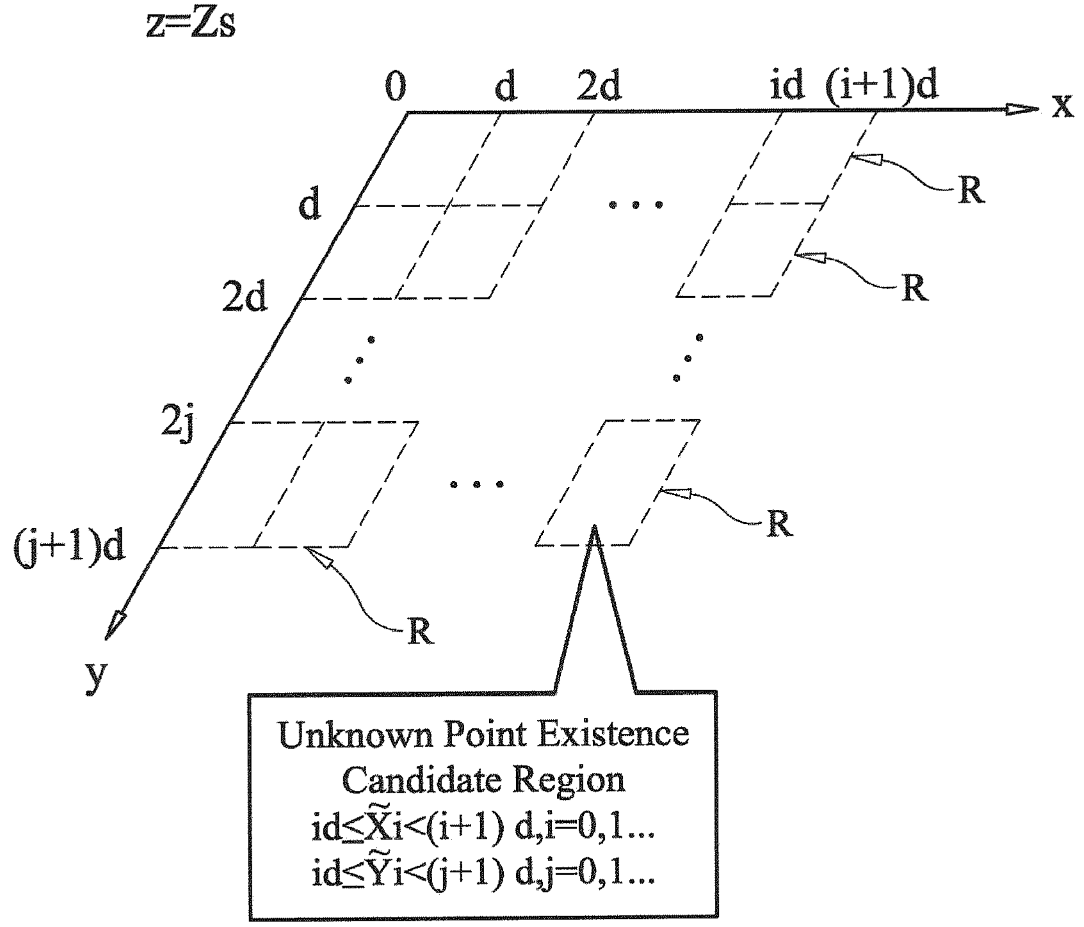
FIG. 3 is a schematic view illustrating a plurality of unknown point existence candidate regions set by dividing an underwater positioning range.

Specifically, an underwater positioning range in which a heavy machine, a structure, or the like to which the acoustic transmitter 2 is attached is first divided in a mesh shape of a predetermined size (a square one side of which has a length d in an example illustrated in FIG. 3), to set a plurality of regions R, as illustrated in FIG. 3. In FIG. 3, the underwater positioning range is divided into (i×j) regions R. The underwater positioning range is a horizontal xy plane having a constant height (z=Zs).

Then, when the acoustic transmitter 2 is installed in each of the regions R, a time window until a direct wave emitted from the acoustic transmitter 2 reaches each of the hydrophones 3 is calculated for the region R, and a plurality of time windows (a time window group) for the regions R are stored in the time window DB 4 for each of the hydrophones 3. At this time, xy coordinates of the acoustic transmitter 2 are set to any coordinates (e.g., a central point) in the region R, and xy coordinates of each of the hydrophones 3 are set to a known point. Although the xy coordinates of each of the hydrophones 3 can be set to any place in the underwater positioning range, the time window for each of the regions R including the acoustic transmitter 2 is preferably optimized to be determined as uniquely as possible. A sound wave for which a time window is set is not limited to a direct wave, but may include a reflected wave.

The time window is set to include a minimum reach time period of the sound wave in a case where the acoustic transmitter 2 is located closest to the hydrophone 3 in the region R and a maximum reach time period of the sound wave in a case where the acoustic transmitter 2 is located farthest from the hydrophone 3 in the region R.

Figure 4:
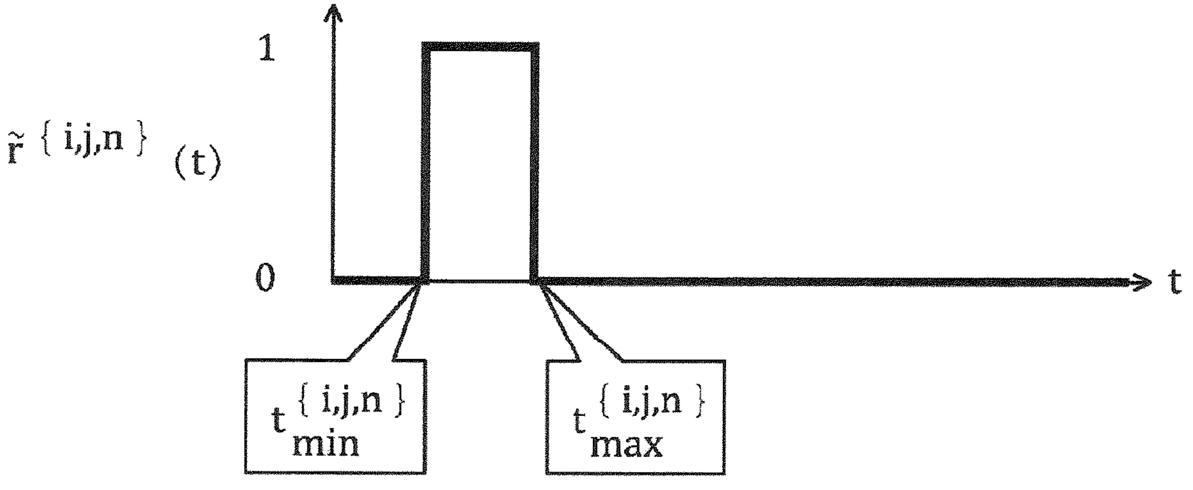
FIG. 4 is a schematic view illustrating a time window in which a direct wave can exist in an impulse response of a propagation path between an acoustic transmitter and a hydrophone.

Equation 1 represents a minimum value of a time period during which the sound wave reaches the n-th (n=1, 2) hydrophone 3 provided at coordinates (Xrn, Yrn, Zs) from the acoustic transmitter 2 located in the region R the center of which has xy coordinates of (i+d/2, j+d/2, Zs) among the regions R (id≤Xi<(i+1)d, jd≤Yj<(j+1)d, Zs). Equation 2 represents a maximum value of a time period during which the sound wave reaches the n-th hydrophone 3 from the acoustic transmitter 2 in the region R. In Equations 1 and 2, "c" is a sound speed in the underwater positioning range. A time window calculated on the basis of Equations 1 and 2 is illustrated in FIG. 4.

[Equation 1]

$$t_{min}^{\{i,j,n\}} = \min\sqrt{(X_{rn}-X_i)^2+(Y_{rn}\rightarrow Y_j)^2}/c \tag{1}$$

[Equation 2]

$$t_{max}^{\{i,j,n\}} = \max\sqrt{(X_{rn}-X_i)^2+(Y_{rn}-Y_j)^2}/c \tag{2}$$

Figure 5:
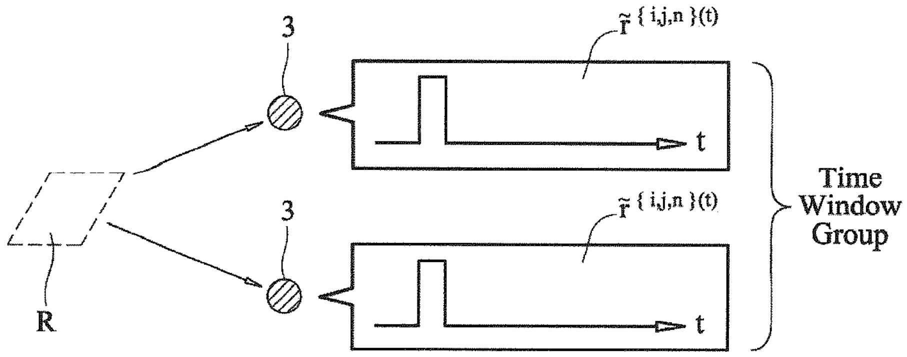
FIG. 5 is a diagram illustrating a time window group until a sound wave reaches two hydrophones from an acoustic transmitter.

A time window group until the sound wave emitted from the acoustic transmitter 2 located in the region R reaches the two hydrophones 3 is illustrated in FIG. 5. The time window DB 4 stores the time window group for each of the two hydrophones 3. A shape of a time window is not limited to a rectangle illustrated in FIGS. 4 and 5.

The size of the region R is appropriately changeable in consideration of a processing cost and a positioning accuracy that increase in proportion to a data amount. For example, when the size of the region R is set large, a calculation cost is small, while the positioning accuracy deteriorates. On the other hand, when the size of the region R is set small, the positioning accuracy is stabilized to be good and substantially constant, while the calculation cost increases as the size of the region R decreases. A shape of the region R may be any planar shape. Further, when the underwater positioning range is set in three dimensions, the region R may be set to a three-dimensional shape.

<Positioning Phase>

Then, a sound wave is actually propagated between the acoustic transmitter 2 and the hydrophones 3, and the coordinate estimation and specification unit 6 specifies coordinates of the acoustic transmitter 2 after roughly estimating an underwater position of the acoustic transmitter 2.

Specifically, a digital electrical signal generated by the signal generation unit 5 is output as an analog electrical signal by the D/A converter 7, is amplified by the amplifier 2*a*, and is then converted into a sound wave by the acoustic transmitter 2 and transmitted into water.

The sound wave reaches the hydrophones 3 after propagating in water at a speed of about 1500 meters per second. The two hydrophones 3 are respectively arranged at known coordinates (Xr1, Yr1, Zs) and coordinates (Xr2, Yr2, Zs).

Figure 6:
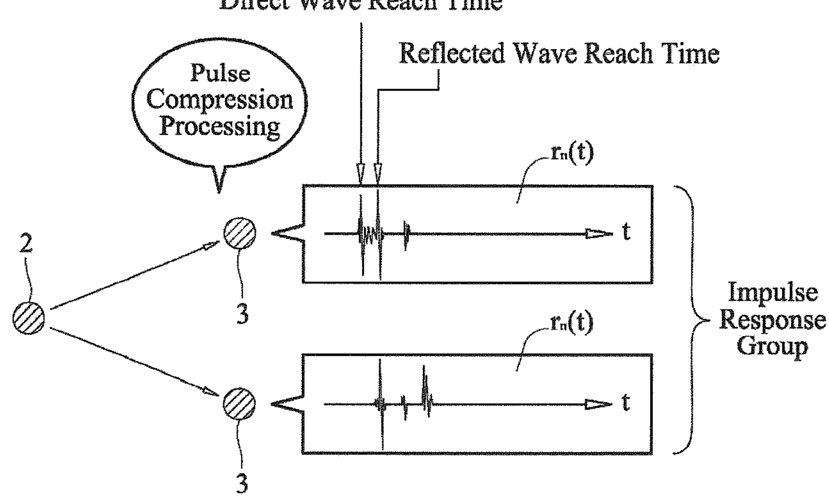
FIG. 6 is a diagram illustrating impulse responses of propagation paths between an acoustic transmitter and two hydrophones, which are respectively obtained by pulse-compression processing on sound waves received by the hydrophones.

A signal received by each of the hydrophones 3 is amplified by the amplifier 3*a*, is then converted into a digital electrical signal (received signal) by the A/D converter 8, and is recorded. FIG. 6 is a schematic view illustrating impulse responses of propagation paths between the acoustic transmitter and the two hydrophones 3, which are respectively obtained by pulse-compression processing on signals received by the hydrophones 3.

Generally, the sound wave received by each of the hydrophones 3 includes a sound wave reflected by a water surface, a water bottom, or a structure (reflected wave) and a sound wave diffracted by a water bottom or a structure (diffracted wave) in addition to a direct wave that advances straight from the acoustic transmitter 2 toward the hydrophone 3. In the case of the impulse response in which the reflected wave has a larger amplitude than that of the direct wave, as illustrated in FIG. 6, its peak reach time period may be erroneously determined as a direct wave reach time period.

The coordinate estimation and specification unit 6 takes an inner product of the time window illustrated in FIG. 5 and the impulse response illustrated in FIG. 6 to calculate an impulse response to which the time window is applied (hereinafter referred to as a "time window-applied impulse response"). The time window-applied impulse response is calculated for each of the two hydrophones 3.

[Equation 3]

$$\hat{r}_n^{(i,j)}(t) = r_n(t)\bar{r}^{(i,j,n)}(t) \tag{3}$$

Further, the coordinate estimation and specification unit 6 calculates the total energy (output) of the time window-applied impulse responses of all the hydrophones 3 for each of the regions R, as expressed by Equation 4.

[Equation 4]

$$E_n^{(i,j)} = \sum_n \left|\hat{r}_n^{(i,j)}(t)\right|^2 \tag{4}$$

The coordinate estimation and specification unit 6 estimates the region R corresponding to (i, j) at which the total energy of the time window-applied impulse responses is maximized as a region Rt where the acoustic transmitter 2 exists.

Then, the coordinate estimation and specification unit 6 specifies, coordinates of the acoustic transmitter 2, in the region Rt where the acoustic transmitter 2 is estimated to be located.

Figure 7:
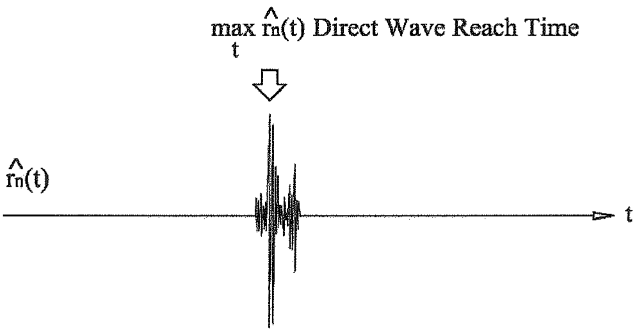
FIG. 7 is a diagram illustrating a time window-applied impulse response as an inner product of a time window illustrated in FIG. 5 and an impulse response illustrated in FIG. 6.

Specifically, the coordinate estimation and specification unit 6 calculates a peak reach time period in the time window-applied impulse response in the region Rt as illustrated in FIG. 7 as a direct wave reach time period for each of the two hydrophones 3.

Then, the direct wave reach time period is multiplied by a sound speed c in the underwater positioning range, thereby obtaining a distance In from the acoustic transmitter 2 to the n-th hydrophone 3, as expressed by Equation 5. Similarly, a direct wave reach time and a distance In are calculated below for all the hydrophones 3.

[Equation 5]

$$l_n = c\max_t \hat{r}_n^{(i,j)}(t) \tag{5}$$

The coordinate estimation and specification unit 6 solves a simultaneous equation expressed by Equation 6 using a least square method or the like on the basis of the coordinates of each of the hydrophones 3 and the distance In, to specify an underwater position, i.e., coordinates (Xt, Yt, Zs) of the acoustic transmitter 2.

[Equation 6]

$$\begin{cases} (X_t - X_{r1})^2 + (Y_t - Y_{r1})^2 = l_1^2 \\ (X_t - X_{r2})^2 + (Y_t - Y_{r2})^2 = l_2^2 \end{cases} \tag{6}$$

The region R for dividing the underwater positioning range is not limited to the above-described one. For example, the underwater positioning range may be divided by a hierarchical structure including first regions R1 each having a large area and second regions R2 each having a small area set by dividing each of the first regions R1, as illustrated in FIG. 8.

Figure 8:
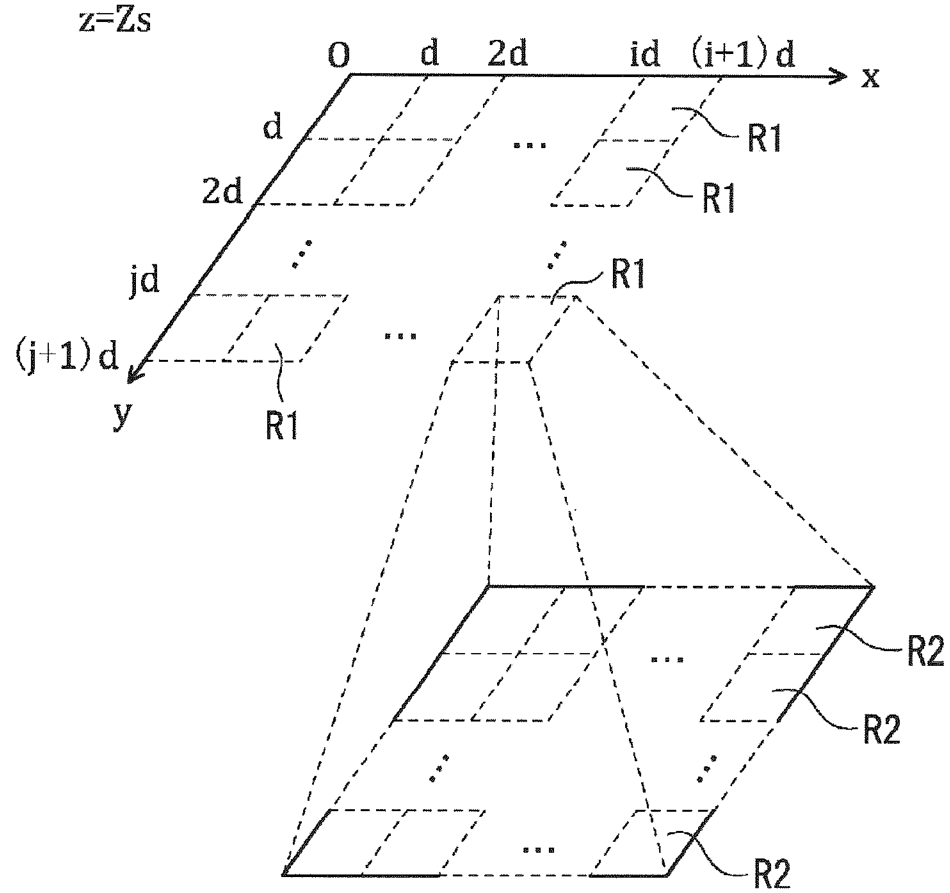
FIG. 8 is a schematic view illustrating a procedure for globally estimating a first region and a second region in this order for coordinates of an acoustic transmitter.

When the underwater positioning range is divided into a higher hierarchy including the first regions R1 and a lower hierarchy including the second regions R2, as illustrated in FIG. 8, the time window DB 4 stores a time window for each of the first regions R1 and the second regions R2. The coordinate estimation and specification unit 6 can be configured to compare the total energies of time window-applied impulse responses for the first regions R1 to estimate the first region R1 where the acoustic transmitter 2 is located and compare the total energies of time window-applied impulse responses for the second regions R2 in the estimated first region R1 to estimate the second region R2 where the acoustic transmitter 2 is located. The number of hierarchical structures of the underwater positioning range is not limited to two, described above, but may be three or more.

Thus, the first regions R1 each having a large area and the second regions R2 each having a small area are estimated in this order, thereby enabling power saving of data processing required for position estimation.

Although a case where an underwater position of the acoustic transmitter 2 is specified by paying attention to a direct wave included in the sound wave that has propagated from the acoustic transmitter 2 to each of the hydrophones 3 has been described as an example in the present embodiment, the underwater position of the acoustic transmitter 2 may be specified by paying attention to a reflected wave included in the sound wave that has propagated from the acoustic transmitter 2 to each of the hydrophones 3.

In this case, to avoid the propagation of the reflected wave being complicated in calculating a time window group in a simulation phase and in setting a sound field where a field water area is reproduced, a boundary of the reflected wave is preferably limited to a quay, an artificial signal reflection device, an average seafloor surface, or the like.

Second Embodiment

Then, an underwater positioning system 1 according to a second embodiment of the preset invention will be described with reference to the drawings. The underwater positioning system 1 according to the present embodiment differs in components described below from and is common in other components to the above-described underwater positioning system 1 according to the first embodiment. The components in the underwater positioning system 1 according to the present embodiment, which are common to those in the underwater positioning system 1 according to the first embodiment, are respectively denoted by the same reference numerals, and overlapping description thereof is omitted.

Figure 9A:
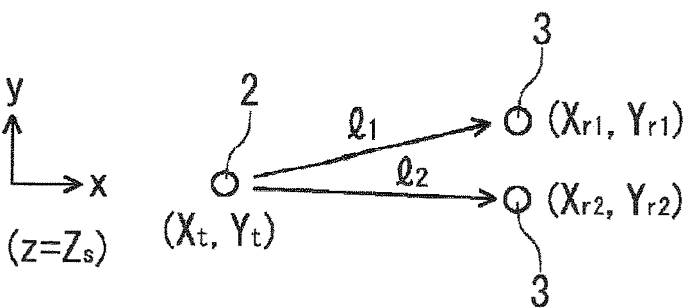
FIG. 9(*a*) is a schematic view illustrating a positional relationship between an acoustic transmitter and hydrophones in an underwater positioning system according to a second embodiment of the present invention, and FIG. 9(*b*) is a schematic view illustrating a procedure for estimating and specifying respective positions of the hydrophones in the underwater positioning system according to the present embodiment.
Figure 9B:
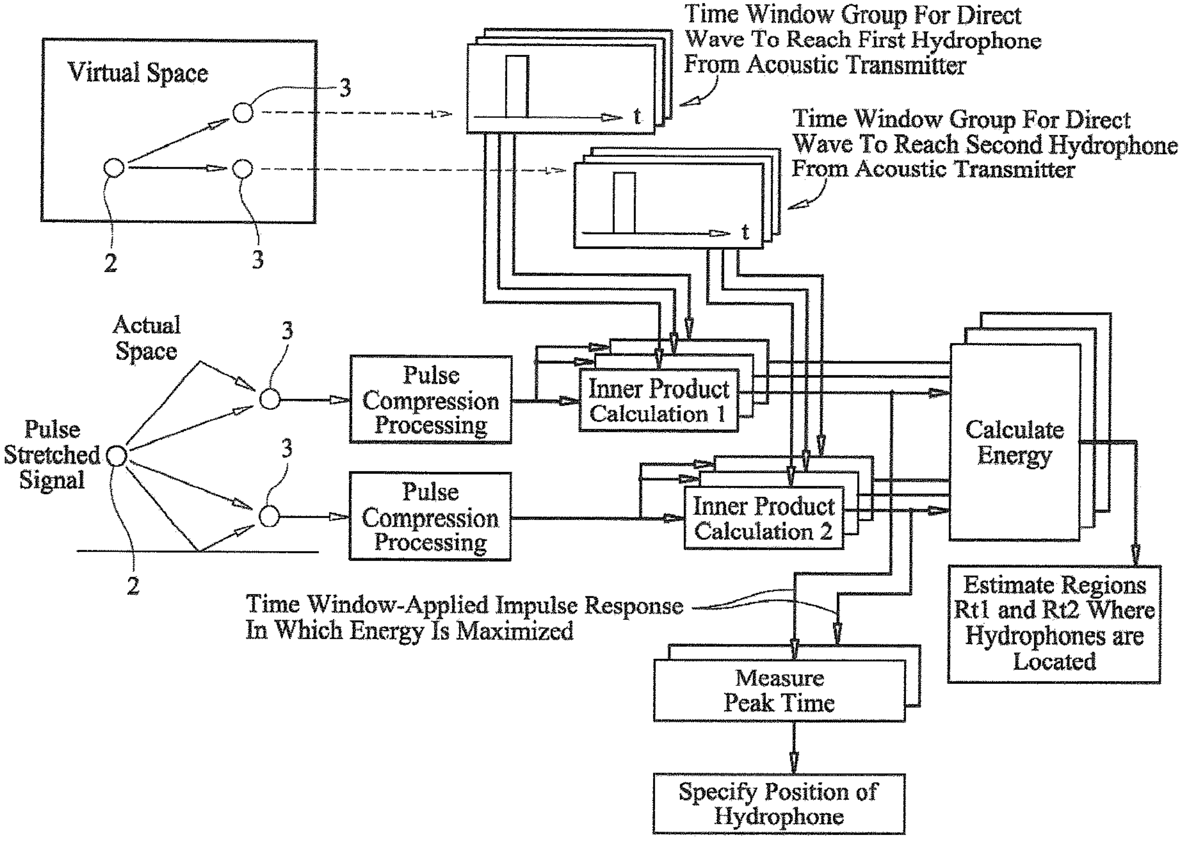

FIG. 9(*a*) is a schematic view illustrating a positional relationship between an acoustic transmitter 2 and a hydrophone 3 in the present embodiment. The underwater positioning system 1 according to the present embodiment includes an acoustic transmitter 2 and two hydrophones 3.

In the present embodiment, a case where the one acoustic transmitter 2 is provided at coordinates (Xt, Yt, Zs) of a known point to position coordinates of each of the two hydrophones 3 each attached to a heavy machine, a structure, or the like and arranged at coordinates (Xrn, Yrn, Zs) of an unknown point will be described as an example. A distance l between the two hydrophones 3 is known, and a positional relationship, i.e., a difference (ΔX, ΔY) on xy coordinates between the two hydrophones 3 is obtained from an azimuth angle obtained from azimuth meters separately installed, respectively, in the hydrophones 3. Although a case where the acoustic transmitter 2 and the hydrophones 3 are arranged on the same xy plane (z=Zs is constant) will be described below as an example for convenience of illustration, the acoustic transmitter 2 and the hydrophones 3 may be respectively arranged at different z coordinates.

<Procedure for Underwater Positioning>

Then, a procedure for estimating the coordinates of each of the two hydrophones 3 using the underwater positioning system 1 according to the present embodiment will be described with reference to the drawings. FIG. 9(*b*) is a schematic view illustrating a procedure for estimating an underwater position of each of the hydrophones 3.

<Simulation Phase>

First, when it is assumed that the hydrophones 3 exist in regions R set by dividing an underwater positioning range on a virtual space, a time window until a sound wave reaches the first hydrophone 3 at an unknown point from the acoustic transmitter 2 at a known point is calculated for each of the regions R, a time window of the second hydrophone 3 is calculated on the basis of a time window of the first hydrophone 3 and a difference (ΔX, ΔY) on xy coordinates from the first hydrophone 3, and a plurality of time windows (a time window group) for the regions R is stored in a time window DB 4 for each of the hydrophones 3.

The time window is set to include a minimum reach time period of the sound wave in a case where the hydrophone 3 is located closest to the acoustic transmitter 2 in the region R and a maximum reach time period of the sound wave in a case where the hydrophone 3 is located farthest from the acoustic transmitter 2 in the region R.

Equation 7 represents a minimum value of a time period during which the sound wave reaches the first hydrophone 3 located in the region R the center of which has xy coordinates of (i+d/2, j+d/2, Zs) among the regions R (id≤Xi<(i+1)d, jd≤Yj<(j+1)d, Zs) from the acoustic transmitter 2 provided at the coordinates (Xt, Yt, Zs) of the known point, and Equation 8 represents a minimum value of a time period during which the sound wave reaches the second hydrophone 3. Equation 9 represents a maximum value of a time period during which the sound wave reaches the first hydrophone located in the region R from the acoustic transmitter 2, and Equation 10 represents a maximum value of a time period during which the sound wave reaches the second hydrophone located in the region R from the acoustic transmitter 2.

[Equation 7]

$$t_{min}^{(i,j,n)} = \min\sqrt{(X_{in} - X_t)^2 + (Y_{jn} - Y_t)^2}/c \tag{7}$$

[Equation 8]

$$t_{min}^{(i,j,n)} = \min\sqrt{(X_{in} + \Delta X - X_t)^2 + (Y_{jn} + \Delta Y - Y_t)^2}/c \tag{8}$$

[Equation 9]

$$t_{max}^{(i,j,n)} = \max\sqrt{(X_{in} - X_t)^2 + (Y_{jn} - Y_t)^2}/c \tag{9}$$

[Equation 10]

$$t_{max}^{(i,j,n)} = \max\sqrt{(X_{in} + \Delta X - X_t)^2 + (Y_{jn} + \Delta Y - Y_t)^2}/c \tag{10}$$

<Positioning Phase>

Then, the sound wave is actually propagated to the two hydrophones 3 each arranged at the unknown coordinates (Xrn, Yrn, Zs) from the acoustic transmitter 2 arranged at the coordinates (Xt, Yt, Zs) of the known point. A signal received by each of the hydrophones 3 is pulse-compressed, to obtain an impulse response of a propagation path between the acoustic transmitter 2 and the hydrophone 3.

Then, Equation 3 is used to take an inner product of a time window as a time range in which the sound wave reaches the n-th hydrophone 3 when the hydrophone 3 exists in the region R and the impulse response of the propagation path between the acoustic transmitter 2 and the n-th hydrophone 3, thereby obtaining a time window-applied impulse response.

Further, Equation 4 is used to calculate the total energy of respective time window-applied impulse responses of all the hydrophones 3 for each of the regions R. The region R corresponding to (i, j) at which the total energy of the time window-applied impulse responses is maximized is estimated as regions Rt1 and Rt2 where the two hydrophones 3 respectively exist.

Then, a coordinate estimation and specification unit 6 specifies coordinates of each of the hydrophones 3 in the regions Rt1 and Rt2 where the hydrophones 3 are respectively located. Specifically, the coordinate estimation and specification unit 6 first calculates for each of the hydrophones 3 a peak reach time period of the time window-applied impulse response in each of the regions Rt1 and Rt2 as a direct wave reach time period.

Then, the direct wave reach time period is multiplied by a sound speed c in an underwater positioning range, thereby obtaining a distance In from the acoustic transmitter 2 to the n-th hydrophone 3, as expressed by Equation 5. Similarly, the direct wave reach time period and the distance In are calculated below for all the hydrophones 3.

The coordinate estimation and specification unit 6 solves a simultaneous equation expressed by Equation 11 using a least square method or the like on the basis of the coordinates of the acoustic transmitter 2, a positional relationship (ΔX, ΔY) between the two hydrophones 3, and the distance In, to specify an underwater position, i.e., the coordinates (Xrn, Yrn, Zs) of each of the two hydrophones 3.

[Equation 11]

$$\begin{cases} X_{r2} = X_{r1} + \Delta X,\ Y_{r2} = Y_{r1} + \Delta Y \\ (X_t - X_{r1})^2 + (Y_t - Y_{r1})^2 = l_1^2 \\ (X_t - X_{r2})^2 + (Y_t - Y_{r2})^2 = l_2^2 \end{cases} \tag{11}$$

Third Embodiment

Then, an underwater positioning system 1 according to a third embodiment of the preset invention will be described with reference to the drawings. The underwater positioning system 1 according to the present embodiment differs in components described below from and is common in other components to the above-described underwater positioning system 1 according to the first embodiment. The components in the underwater positioning system 1 according to the present embodiment, which are common to those in the underwater positioning system 1 according to the first embodiment, are respectively denoted by the same reference numerals, and overlapping description thereof is omitted.

Figure 10A:
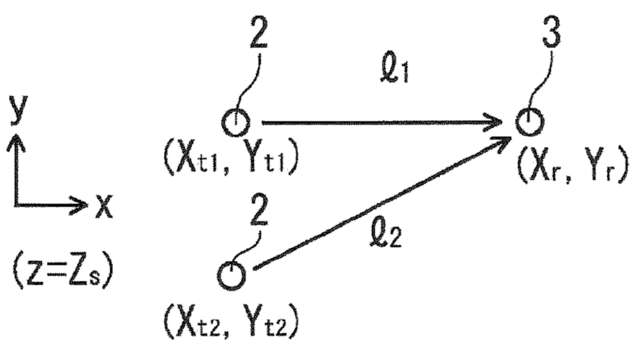
FIG. 10(*a*) is a schematic view illustrating a positional relationship between acoustic transmitters and a hydrophone in an underwater positioning system according to a third embodiment of the present invention, and FIG. 10(*b*) is a schematic view illustrating a procedure for estimating and specifying respective positions of the acoustic transmitters in the underwater positioning system according to the present embodiment.
Figure 10B:
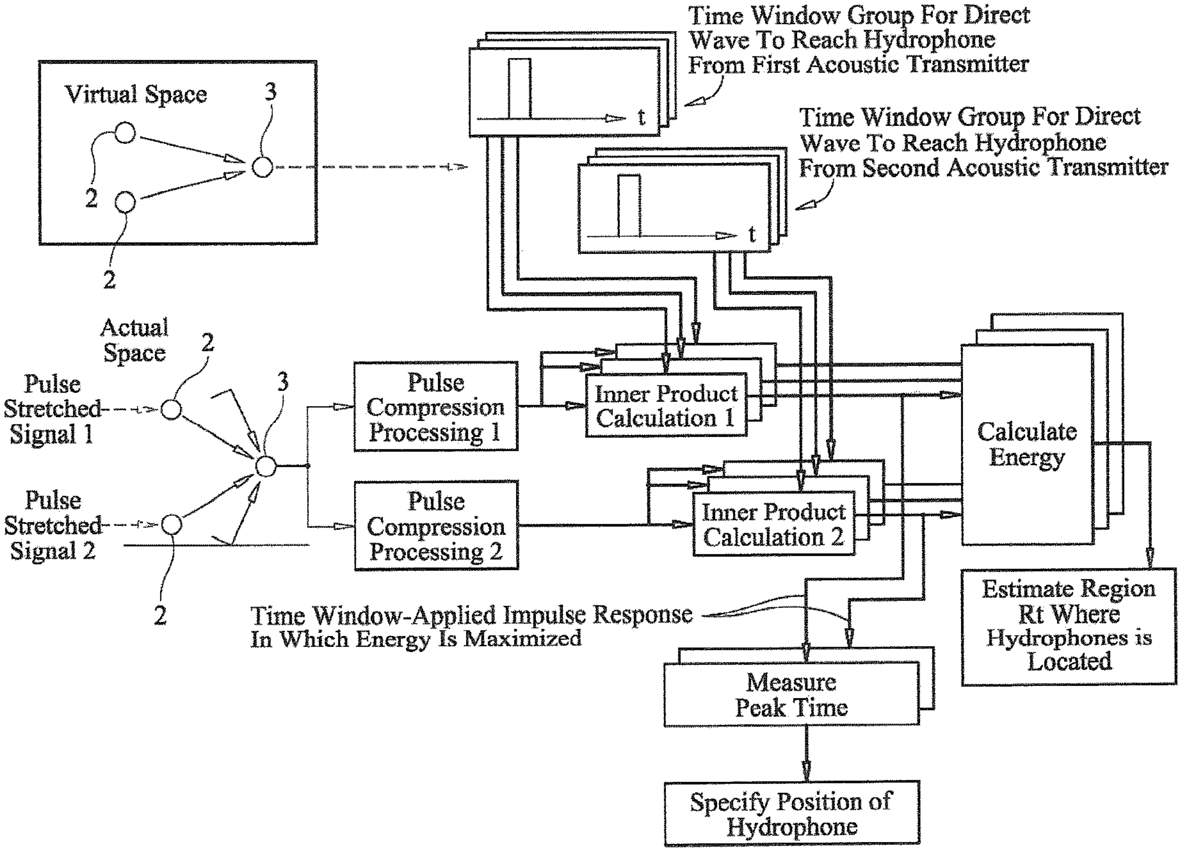

FIG. 10(*a*) is a schematic view illustrating a positional relationship between an acoustic transmitter 2 and a hydrophone 3 in the present embodiment. The underwater positioning system 1 includes two acoustic transmitters 2 and one hydrophone 3.

In the present embodiment, a case where the two acoustic transmitters 2 are each provided at coordinates (Xtn, Ytn, Zs) of a known point to position coordinates of the one hydrophone 3 attached to a heavy machine, a structure, or the like and arranged at coordinates (Xr, Yr, Zs) of an unknown point will be described as an example. Although a case where the acoustic transmitters 2 and the hydrophone 3 are arranged on the same xy plane (z=Zs is constant) will be described below as an example for convenience of illustration, the acoustic transmitters 2 and the hydrophone 3 may be respectively arranged at different z coordinates.

<Procedure for Underwater Positioning>

Then, a procedure for estimating the coordinates of the hydrophone 3 using the underwater positioning system 1 according to the present embodiment will be described with reference to the drawings. FIG. 10(*b*) is a schematic view illustrating a procedure for estimating an underwater position of the hydrophone 3.

<Simulation Phase>

First, when it is assumed that the hydrophone 3 exists in regions R set by dividing an underwater positioning range on a virtual space, a time window until a sound wave reaches the hydrophone 3 at an unknown point from each of the acoustic transmitters 2 at known points is calculated for each of the regions R, and a plurality of time windows (a time window group) for each of the regions R is stored in a time window DB 4 for each of the acoustic transmitters 2.

The time window is set to include a minimum reach time period of the sound wave in a case where the hydrophone 3 is located closest to the acoustic transmitter 2 in the region R and a maximum reach time period of the sound wave in a case where the hydrophone 3 is located farthest from the acoustic transmitter 2 in the region R.

Equation 12 represents a minimum value of a time period during which the sound wave reaches the hydrophone 3 located in the region R the center of which has xy coordinates of (i+d/2, j+d/2, Zs) among the regions R (id≤Xi<(i+1)d, jd≤Yj<(j+1)d, Zs) from the acoustic transmitter 2 provided at the coordinates (Xtn, Ytn, Zs) of the known point. Equation 13 represents a maximum value of a time period during which the sound wave reaches the hydrophone 3 in the region R from each of the acoustic transmitters 2.

[Equation 12]

$$t_{min}^{(i,j,n)} = \min\sqrt{(X_i - X_{tn})^2 + (Y_j - Y_{tn})^2}/c \tag{12}$$

[Equation 13]

$$t_{max}^{(i,j,n)} = \max\sqrt{(X_i - X_{tn})^2 + (Y_j - Y_{tn})^2}/c \tag{13}$$

<Positioning Phase>

Then, the sound wave is actually propagated to the hydrophone 3 arranged at the unknown coordinates (Xr, Yr, Zs) from the two acoustic transmitters 2 respectively arranged at coordinates (Xt1, Yt1, Zs) and coordinates (Xt2, Yt2, Zs) of known points. A signal received by the hydrophone 3 is pulse-compressed, to obtain an impulse response of a propagation path between each of the acoustic transmitters 2 and the hydrophone 3. Pulse stretched signals respectively emitted from the two acoustic transmitters 2 are preferably set to ones having a small cross-correlation coefficient.

Then, Equation 3 is used to take an inner product of a time window as a time range in which the sound wave reaches the hydrophone 3 when the hydrophone 3 exists in the region R and the impulse response of the propagation path between each of the acoustic transmitters 2 and the hydrophone 3, thereby obtaining a time window-applied impulse response.

Further, Equation 4 is used to calculate the total energy of the time window-applied impulse response of the hydrophone 3 for each of the regions P. The region R corresponding to (i, j) at which the total energy of the time window-applied impulse response is maximized is estimated as a region Rt where the hydrophone 3 exists.

Then, a coordinate estimation and specification unit 6 specifies coordinates of the hydrophone 3 in the region Rt where the hydrophone 3 is located. Specifically, the coordinate estimation and specification unit 6 first calculates a peak reach time period of the time window-applied impulse response in the region Rt as a direct wave reach time period.

Then, the direct wave reach time period is multiplied by a sound speed c in an underwater positioning range, thereby obtaining a distance In from each of the acoustic transmitters 2 to the hydrophone 3, as expressed by Equation 5.

The coordinate estimation and specification unit 6 solves a simultaneous equation expressed by Equation 14 using a least square method or the like on the basis of the coordinates of each of the acoustic transmitters 2 and the distance In, to specify an underwater position, i.e., the coordinates (Xr, Yr, Zs) of the hydrophone 3.

[Equation 14]

$$\begin{cases} (X_{t1} - X_r)^2 + (Y_{t1} - Y_r)^2 = l_1^2 \\ (X_{t2} - X_r)^2 + (Y_{t2} - Y_r)^2 = l_2^2 \end{cases} \tag{14}$$

Fourth Embodiment

Then, an underwater positioning system 1 according to a fourth embodiment of the preset invention will be described with reference to the drawings. The underwater positioning system 1 according to the present embodiment differs in components described below from and is common in other components to the above-described underwater positioning system 1 according to the first embodiment. The components in the underwater positioning system 1 according to the present embodiment, which are common to those in the underwater positioning system 1 according to the first embodiment, are respectively denoted by the same reference numerals, and overlapping description thereof is omitted.

Figure 11A:
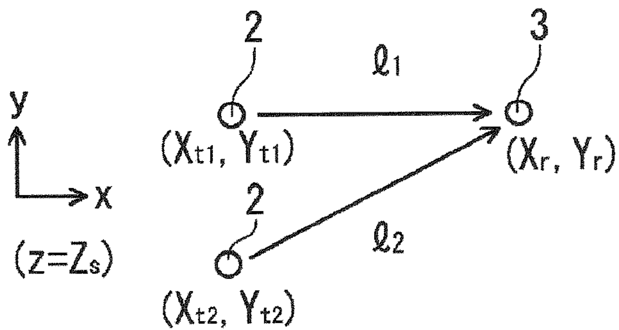
FIG. 11(*a*) is a schematic view illustrating a positional relationship between acoustic transmitters and a hydrophone in an underwater positioning system according to a fourth embodiment of the present invention, and FIG. 11(*b*) is a schematic view illustrating a procedure for estimating and specifying a position of the hydrophone in the underwater positioning system according to the present embodiment.
Figure 11B:
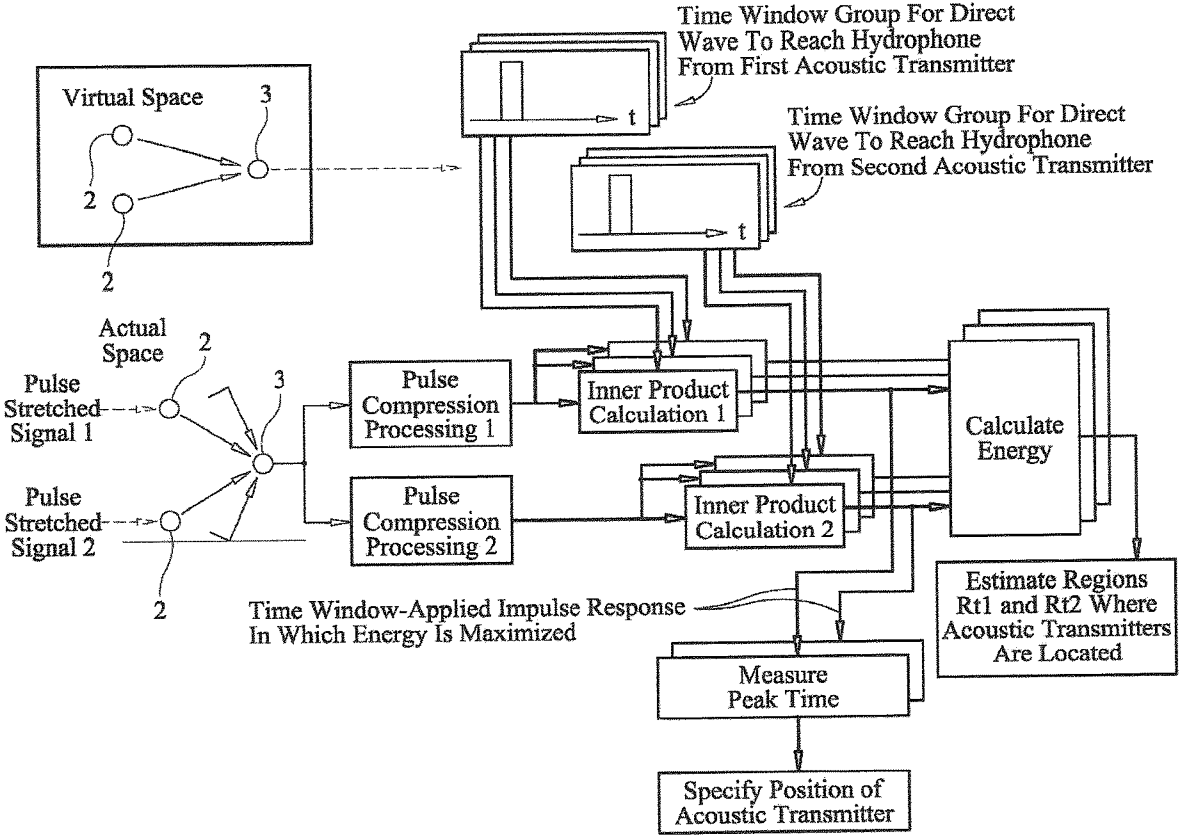

FIG. 11(*a*) is a schematic view illustrating a positional relationship between an acoustic transmitter 2 and a hydrophone 3 in the present embodiment. The underwater positioning system 1 includes two acoustic transmitters 2 and one hydrophone 3.

In the present embodiment, a case where the one hydrophone 3 is provided at coordinates (Xr, Yr, Zs) of a known point to position coordinates of each of the two acoustic transmitters 2 each attached to a heavy machine, a structure, or the like and arranged at coordinates (Xrn, Yrn, Zs) of an unknown point will be described as an example. A positional relationship, i.e., a difference (ΔX, ΔY) on xy coordinates between the two acoustic transmitters 2 is known. Although a case where the acoustic transmitters 2 and the hydrophone 3 are arranged on the same xy plane (z Zs is constant) will be described below as an example for convenience of illustration, the acoustic transmitters 2 and the hydrophone 3 may be respectively arranged at different z coordinates.

<Procedure for Underwater Positioning>

Then, a procedure for estimating the coordinates of each of the two acoustic transmitters 2 using the underwater positioning system 1 according to the present embodiment will be described with reference to the drawings. FIG. 11(*b*) is a schematic view illustrating a procedure for estimating an underwater position of the acoustic transmitter 2.

<Simulation Phase>

First, when it is assumed that the acoustic transmitters 2 exist in regions R set by dividing an underwater positioning range on a virtual space, a time window until a sound wave reaches the hydrophone 3 at a known point from each of the acoustic transmitters 2 at unknown points is calculated for each of the regions R, and a plurality of time windows (a time window group) for the regions R are stored in a time window DB 4 for each of the acoustic transmitters 2.

The time window is set to include a minimum reach time period of the sound wave in a case where the hydrophone 3 is located closest to the acoustic transmitter 2 in the region R and a maximum reach time period of the sound wave in a case where the hydrophone 3 is located farthest from the acoustic transmitter 2 in the region R.

Equation 15 represents a minimum value of a time period during which the sound wave reaches the hydrophone 3 provided at the coordinates (Xr, Yr, Zs) of the known point from the n-th (n=1, 2) acoustic transmitter 2 located in the region R the center of which has xy coordinates of (i+d/2, j+d/2, Zs) among the regions P (id≤Xi<(i+1)d, jd≤Yj≤(j+1) d, Zs). Equation 16 represents a maximum value of the time period during which the sound wave reaches the hydrophone from the n-th acoustic transmitter 2 in the region R.

[Equation 15]

$$t_{min}^{\{i,j,n\}} = \min\sqrt{(X_{in} - X_r)^2 + (Y_{jn} - Y_r)^2}/c \tag{15}$$

[Equation 16]

$$t_{max}^{\{i,j,n\}} = \max\sqrt{(X_{in} - X_r)^2 + (Y_{jn} - Y_r)^2}/c \tag{16}$$

<Positioning Phase>

Then, the sound wave is actually propagated to the hydrophone 3 arranged at the coordinates (Xr, Yr, Zs) of the known point from the n-th acoustic transmitter 2 arranged at the coordinates (Xrn, Yrn, Zs) of the unknown point. A signal received by the hydrophone 3 is pulse-compressed, to obtain an impulse response of a propagation path between each of the acoustic transmitters 2 and the hydrophone 3. Pulse stretched signals respectively emitted from the two acoustic transmitters 2 are preferably set to ones having a small cross-correlation coefficient.

Then, Equation 3 is used to take an inner product of a time window as a time range in which the sound wave reaches the hydrophone 3 when the n-th acoustic transmitter 2 exists in the region R and the impulse response of the propagation path between the n-th acoustic transmitter 2 and the hydrophone 3, thereby obtaining a time window-applied impulse response.

Further, Equation 4 is used to calculate the total energy of the time window-applied impulse response of the hydrophone 3 for each of the regions R. The region R corresponding to (i, j) at which the total energy of the time window-applied impulse response is maximized is estimated as regions Rt1 and Rt2 where the two hydrophones 2 respectively exist.

Then, a coordinate estimation and specification unit 6 specifies coordinates of the acoustic transmitter 2 in each of the regions Rt1 and Rt2 where the acoustic transmitters 2 are respectively located. Specifically, the coordinate estimation and specification unit 6 first calculates for each of the acoustic transmitters 2 a peak reach time period of the time window-applied impulse response in each of the regions Rt1 and Rt2 as a direct wave reach time period.

Then, the direct wave reach time period is multiplied by a sound speed c in an underwater positioning range, thereby obtaining a distance In from each of the acoustic transmitters 2 to the hydrophone 3, as expressed by Equation 5.

The coordinate estimation and specification unit 6 solves a simultaneous equation expressed by Equation 17 using a least square method or the like on the basis of the coordinates of the hydrophone 3, a positional relationship (ΔX, ΔY) between the two acoustic transmitters 2, and the distance In, to respectively specify underwater positions, i.e., the coordinates (Xt1, Yt1, Zs) and the coordinates (Xt2, Yt2, Zs) of the two acoustic transmitters 2.

[Equation 17]

$$\begin{cases} X_{t2} = X_{t1} + \Delta X,\ Y_{t2} = Y_{t1} + \Delta Y \\ (X_{t1} - X_r)^2 + (Y_{t1} - Y_r)^2 = l_1^2 \\ (X_{t1} - X_r)^2 + (Y_{t1} - Y_r)^2 = l_2^2 \end{cases} \tag{17}$$

Fifth Embodiment

Then, an underwater positioning system 1 according to a fifth embodiment of the preset invention will be described with reference to the drawings. The underwater positioning system 1 according to the present embodiment differs in components described below from and is common in other components to the above-described underwater positioning system 1 according to the first embodiment. The components in the underwater positioning system 1 according to the present embodiment, which are common to those in the underwater positioning system 1 according to the first embodiment, are respectively denoted by the same reference numerals, and overlapping description thereof is omitted.

Figure 12A:
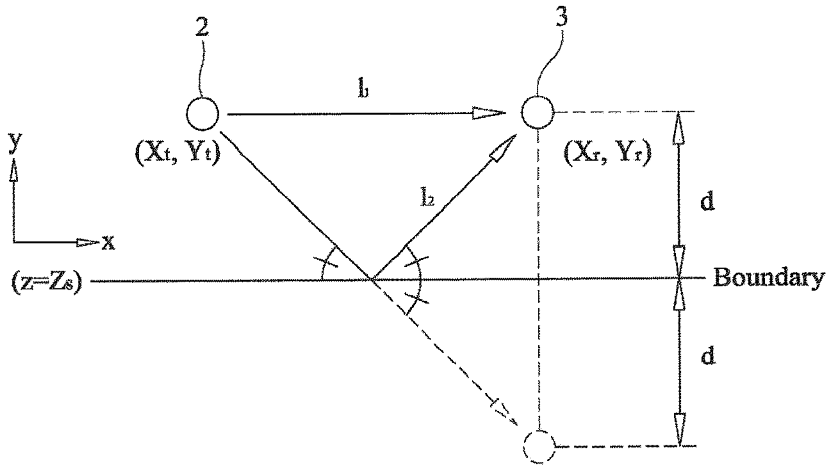
FIG. 12(*a*) is a schematic view illustrating a positional relationship between an acoustic transmitter and a hydrophone in an underwater positioning system according to a fifth embodiment of the present invention, and FIG. 12(*b*) is a schematic view illustrating a procedure for estimating and specifying a position of the acoustic transmitter in the underwater positioning system according to the present embodiment.
Figure 12B:
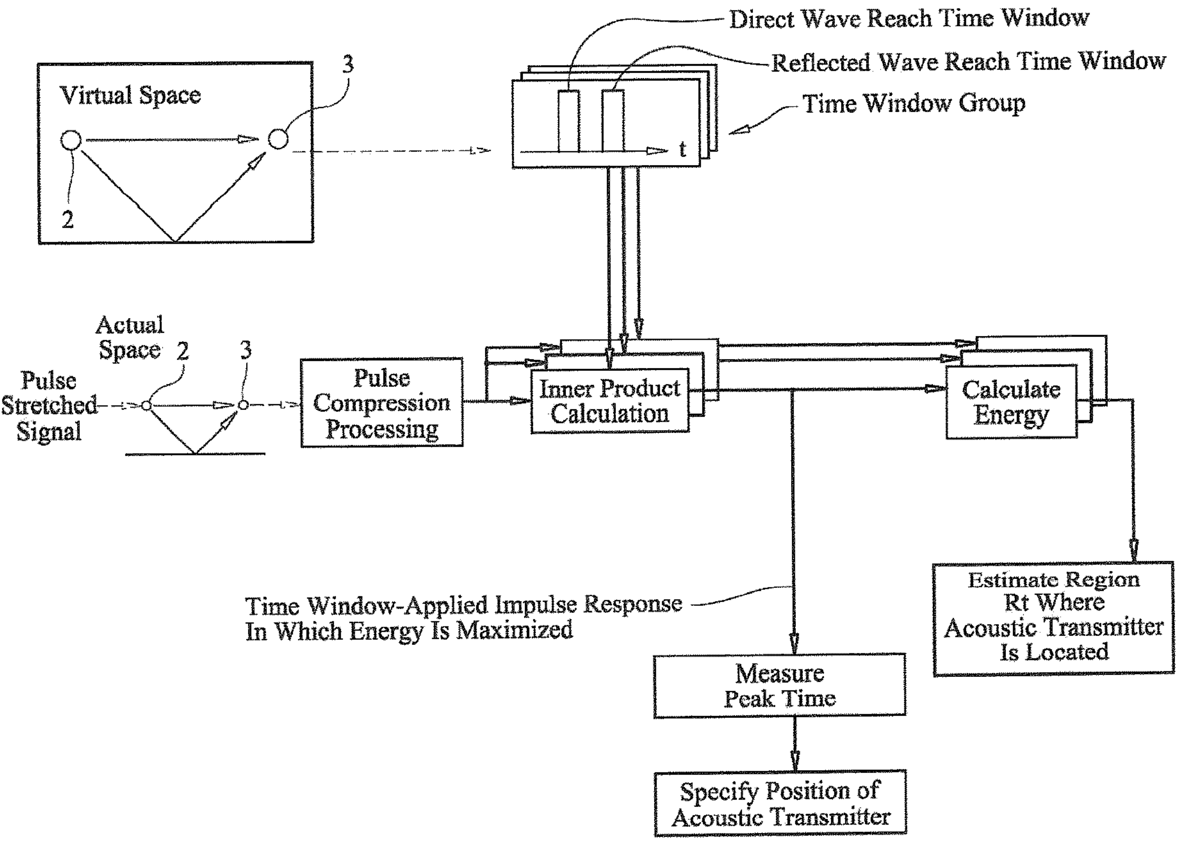

FIG. 12(*a*) is a schematic view illustrating a positional relationship between an acoustic transmitter 2 and a hydrophone 3 in the present embodiment. The underwater positioning system 1 includes one acoustic transmitter 2 and one hydrophone 3.

In the present embodiment, a case where the hydrophone 3 is provided at coordinates (Xr, Yr, Zs) of a known point to position coordinates of the acoustic transmitter 2 attached to a heavy machine, a structure, or the like and arranged at coordinates (Xt, Yt, Zs) of an unknown point will be described as an example. Although a case where the acoustic transmitter 2 and the hydrophone 3 are arranged on the same xy plane (z=Zs is constant) will be described below as an example for convenience of illustration, the acoustic transmitter 2 and the hydrophone 3 may be respectively arranged at different z coordinates.

<Procedure for Underwater Positioning>

Then, a procedure for estimating the coordinates of the acoustic transmitter 2 using the underwater positioning system 1 according to the present embodiment will be described with reference to the drawings. FIG. 12(*b*) is a schematic view illustrating a procedure for estimating an underwater position of the acoustic transmitter 2.

<Simulation Phase>

First, when it is assumed that the acoustic transmitter 2 exists in regions R set by dividing an underwater positioning range on a calculator not illustrated, respective time windows until a direct wave and a reflected wave reach the hydrophone 3 from the acoustic transmitter 2 are calculated, and the calculated time windows are stored in a time window DB 4 for each of the regions R.

The time window related to the direct wave is set to include a minimum reach time period of the direct wave in a case where the hydrophone 3 is located closest to the acoustic transmitter 2 in the region R and a maximum reach time period of the direct wave in a case where the hydrophone 3 is located farthest from the acoustic transmitter 2 in the region R. The time window related to the reflected wave is set to include a minimum reach time period of the reflected wave in a case where the hydrophone 3 is located closest to the acoustic transmitter 2 in the region R and a maximum reach time period of the reflected wave in a case where the hydrophone 3 is located farthest from the acoustic transmitter 2 in the region R.

Equation 18 represents a minimum value of a time period during which the direct wave reaches the hydrophone 3 provided at the coordinates (Xr, Yr, Zs) of the known point from the acoustic transmitter 2 located in the region R the center of which has xy coordinates of (i+d/2, j+d/2, Zs) among the regions R (id≤Xi<(i+1)d, jd≤Yj≤(j+1)d, Zs), and Equation 19 represents a minimum value of a time period during which the reflected wave reaches the hydrophone 3 from the acoustic transmitter 2. Equation 20 represents a maximum value of the time period during which the direct wave reaches the hydrophone 3 from the acoustic transmitter 2 in the region R, and Equation 21 represents a maximum value of the time period during which the reflected wave reaches the hydrophone 3 from the acoustic transmitter 2.

[Equation 18]

$$t_{min}^{(i,j)} = \min\sqrt{(X_i - X_r)^2 + (Y_j - Y_r)^2}/c \tag{18}$$

[Equation 19]

$$t_{min}^{(i,j)} = \min\sqrt{(X_i - X_r)^2 + (Y_j - (Y_r - 2d))^2}/c \tag{19}$$

[Equation 20]

$$t_{max}^{(i,j)} = \max\sqrt{(X_i - X_r)^2 + (Y_j - Y_r)^2}/c \tag{20}$$

[Equation 21]

$$t_{max}^{(i,j)} = \max\sqrt{(X_i - X_r)^2 + (Y_j - (Y_r - 2d))^2}/c \tag{21}$$

<Positioning Phase>

Then, a sound wave is actually propagated to the hydrophone 3 arranged at the coordinates (Xr, Yr, Zs) of the known point from the acoustic transmitter 2 arranged at the coordinates (Xt, Yt, Zs) of the unknown point. A signal received by the hydrophone 3 is pulse-compressed, to obtain an impulse response of a propagation path between the acoustic transmitter 2 and the hydrophone 3.

Then, Equation 3 is used to take an inner product of a time window as a time range in which the direct wave and the reflected wave reach the hydrophone 3 when the acoustic transmitter 2 exists in the region R and the impulse response of the propagation path between the acoustic transmitter 2 and the hydrophone 3, thereby respectively obtaining time window-applied impulse responses related to the direct wave and the reflected wave.

Further, Equation 4 is used to calculate the total energy of the respective time window-applied impulse responses related to the direct wave and the reflected wave for each of the regions R. The region R corresponding to (i, j) at which the total energy of the time window-applied impulse responses is maximized is estimated as a region Rt where the acoustic transmitter 2 exists.

Then, a coordinate estimation and specification unit 6 specifies coordinates of the acoustic transmitter 2 in the region Rt where the acoustic transmitter 2 is located.

Specifically, the coordinate estimation and specification unit 6 first calculates a peak reach time period of the time window-applied impulse response related to the direct wave in the region Rt and a peak reach time period related to the reflected wave in the region Rt, respectively, as a direct wave reach time period and a reflected wave reach time period.

Then, the direct wave reach time period is multiplied by a sound speed c in an underwater positioning range, thereby obtaining a distance l1 from the acoustic transmitter 2 to the hydrophone 3, as expressed by Equation 5.

Similarly, the reflected wave reach time period is multiplied by the sound speed c in the underwater positioning range, thereby obtaining a distance l2 at which the sound wave emitted from the acoustic transmitter 2 is reflected by a boundary to reach the hydrophone 3. A distance d between the hydrophone 3 and a boundary on which the reflected wave is reflected is known.

The coordinate estimation and specification unit 6 solves a simultaneous equation expressed by Equation 22 using a least square method or the like on the basis of the coordinates of the hydrophone 3, the distance d between the hydrophone 3 and the boundary, and the distances l1 and l2, to specify an underwater position, i.e., the coordinates (Xt, Yt, Zs) of the acoustic transmitter 2.

[Equation 22]

$$\begin{cases} (X_t - X_r)^2 + (Y_t - Y_r)^2 = l_1^2 \\ (X_t - X_r)^2 + \{Y_t - (Y_r - 2d)\}^2 = l_2^2 \end{cases} \tag{22}$$

Sixth Embodiment

Then, an underwater positioning system 1 according to a sixth embodiment of the preset invention will be described with reference to the drawings. The underwater positioning system 1 according to the present embodiment differs in components described below from and is common in other components to the above-described underwater positioning system 1 according to the first embodiment. The components in the underwater positioning system 1 according to the present embodiment, which are common to those in the underwater positioning system 1 according to the first embodiment, are respectively denoted by the same reference numerals, and overlapping description thereof is omitted.

Figure 13A:
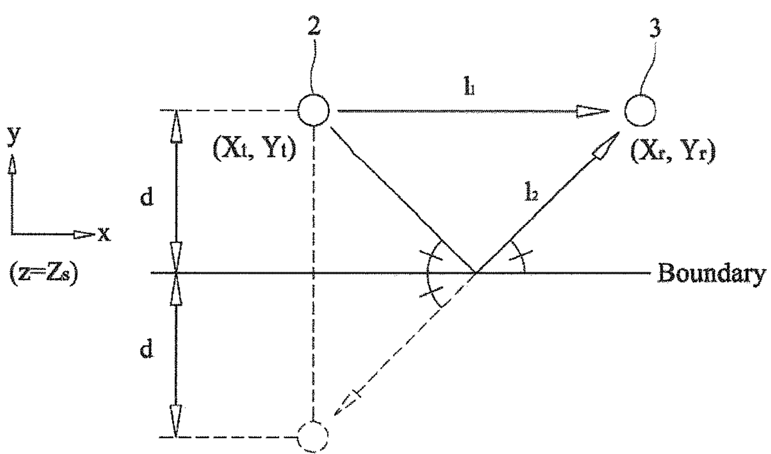
FIG. 13(*a*) is a schematic view illustrating a positional relationship between an acoustic transmitter and a hydrophone in an underwater positioning system according to a sixth embodiment of the present invention, and FIG. 13(*b*) is a schematic view illustrating a procedure for estimating and specifying a position of the hydrophone in the underwater positioning system according to the present embodiment.
Figure 13B:
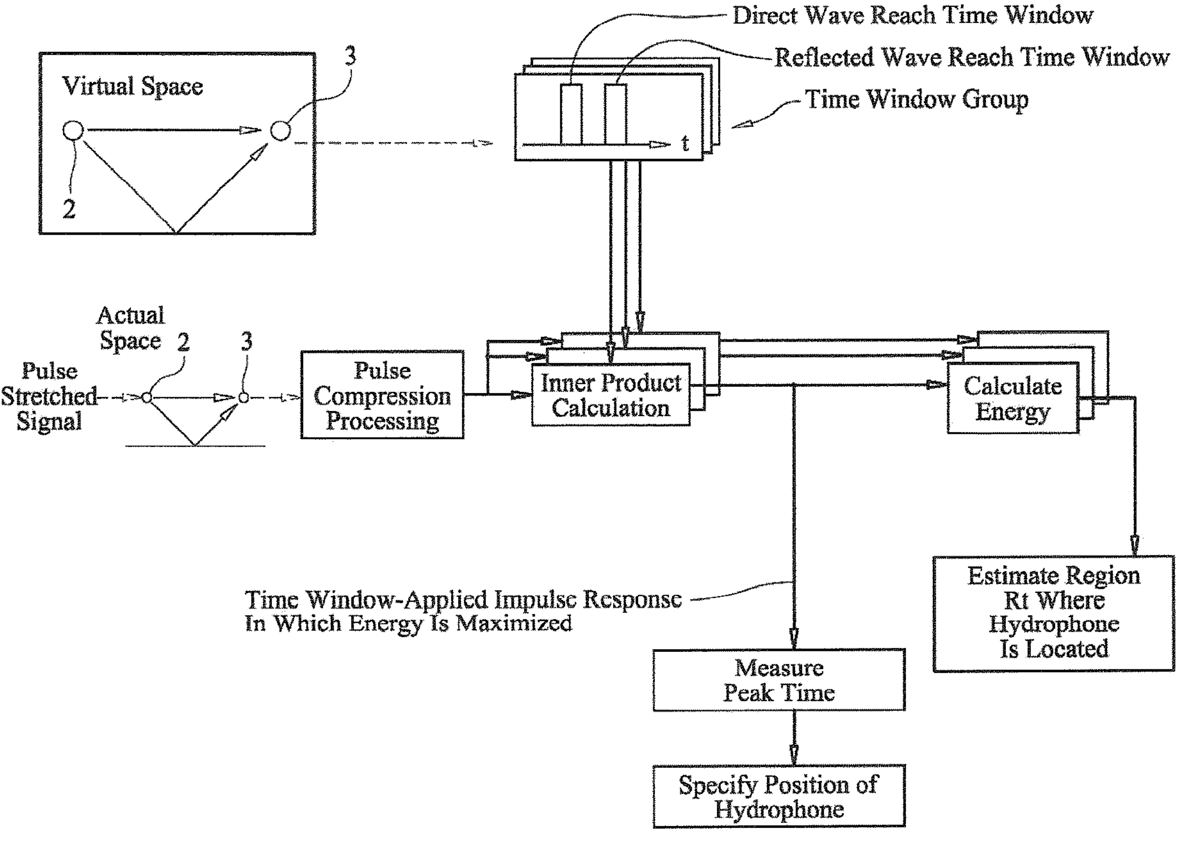
Figure 14:
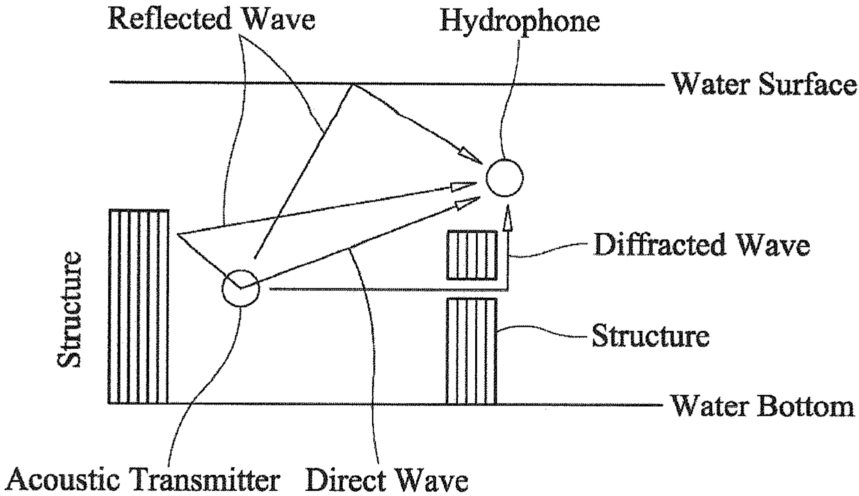
FIG. 14 is a schematic view illustrating how a sound wave propagates between an acoustic transmitter and a hydrophone.
Figure 15:
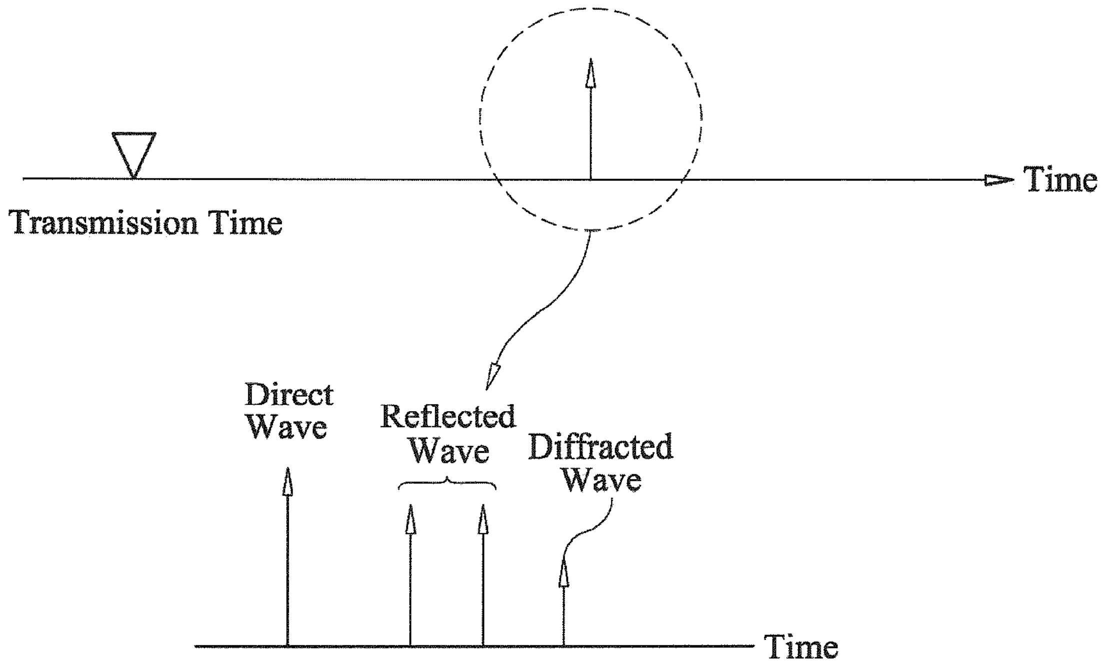
FIG. 15 is a schematic view illustrating how a direct wave, a reflected wave, and a diffracted wave are included in an impulse response of a propagation path between an acoustic transmitter and a hydrophone.

FIG. 13(*a*) is a schematic view illustrating a positional relationship between an acoustic transmitter 2 and a hydrophone 3 in the present embodiment. The underwater positioning system 1 includes one acoustic transmitter 2 and one hydrophone 3.

In the present embodiment, a case where the acoustic transmitter 2 is provided at coordinates (Xt, Yt, Zs) of a known point to position coordinates of the hydrophone 3 attached to a heavy machine, a structure, or the like and arranged at coordinates (Xr, Yr, Zs) of an unknown point will be described as an example. Although a case where the acoustic transmitter 2 and the hydrophone 3 are arranged on the same xy plane (z=Zs is constant) will be described below as an example for convenience of illustration, the acoustic transmitter 2 and the hydrophone 3 may be respectively arranged at different z coordinates.

<Procedure for Underwater Positioning>

Then, a procedure for estimating the coordinates of the hydrophone 3 using the underwater positioning system 1 according to the present embodiment will be described with reference to the drawings. FIG. 13(*b*) is a schematic view illustrating a procedure for estimating an underwater position of the hydrophone 3.

<Simulation Phase>

First, when it is assumed that the hydrophone 3 exists in regions R set by dividing an underwater positioning range on a calculator not illustrated, respective time windows until a direct wave and a reflected wave reach the hydrophone 3 from the acoustic transmitter 2 are calculated, and the calculated time windows are stored in a time window DB 4 for each of the regions R.

The time window related to the direct wave is set to include a minimum reach time period of the direct wave in a case where the hydrophone 3 is located closest to the acoustic transmitter 2 in the region R and a maximum reach time period of the direct wave in a case where the hydrophone 3 is located farthest from the acoustic transmitter 2 in the region R. The time window related to the reflected wave is set to include a minimum reach time period of the reflected wave in a case where the hydrophone 3 is located closest to the acoustic transmitter 2 in the region R and a maximum reach time period of the reflected wave in a case where the hydrophone 3 is located farthest from the acoustic transmitter 2 in the region R.

Equation 23 represents a minimum value of a time period during which the direct wave reaches the hydrophone 3 located in the region R the center of which has xy coordinates of (i+d/2, j+d/2, Zs) among the regions R (id≤Xi<(i+1)d, jd≤Yj<(j+1)d, Zs) from the acoustic transmitter 2 provided at the coordinates (Xt, Yt, Zs) of the known point, and Equation 24 represents a minimum value of a time period during which the reflected wave reaches the hydrophone 3 from the acoustic transmitter 2. Equation 25 represents a maximum value of the time period during which the direct wave reaches the hydrophone 3 in the region R from the acoustic transmitter 2, and Equation 26 represents a maximum value of the time period during which the reflected wave reaches the hydrophone 3 from the acoustic transmitter 2.

[Equation 23]

$$t_{min}^{(i,j)} = \min\sqrt{(X_t - X_i)^2 + (Y_t - Y_j)^2}/c \tag{23}$$

[Equation 24]

$$t_{min}^{(i,j)} = \min\sqrt{(X_t - X_i)^2 + ((Y_t - 2d) - Y_j)^2}/c \tag{24}$$

[Equation 25]

$$t_{max}^{(i,j)} = \max\sqrt{(X_t - X_i)^2 + (Y_t - Y_j)^2}/c \tag{25}$$

[Equation 26]

$$t_{max}^{(i,j)} = \max\sqrt{(X_t - X_i)^2 + ((Y_t - 2d) - Y_j)^2}/c \quad (26)$$

<Positioning Phase>

Then, a sound wave is actually propagated to the hydrophone 3 arranged at the coordinates (Xr, Yr, Zs) of the unknown point from the acoustic transmitter 2 arranged at the coordinates (Xt, Yt, Zs) of the known point. A signal received by the hydrophone 3 is pulse-compressed, to obtain an impulse response of a propagation path between the acoustic transmitter 2 and the hydrophone 3.

Then, Equation 3 is used to take an inner product of a time window as a time range in which the direct wave and the reflected wave reach the hydrophone 3 when the acoustic transmitter 2 exists in the region R and the impulse response of the propagation path between the acoustic transmitter 2 and the hydrophone 3, thereby respectively obtaining time window-applied impulse responses related to the direct wave and the reflected wave.

Further, Equation 4 is used to calculate the total energy of the respective time window-applied impulse responses related to the direct wave and the reflected wave for each of the regions R. The region R corresponding to (i, j) at which the total energy of the time window-applied impulse responses is maximized is estimated as a region Rt where the hydrophone 3 exists.

Then, a coordinate estimation and specification unit 6 specifies coordinates of the hydrophone 3 in the region Rt where the hydrophone 3 is located.

Specifically, the coordinate estimation and specification unit 6 first calculates a peak reach time period of the time window-applied impulse response related to the direct wave in the region Rt and a peak reach time period of the time window-applied impulse response related to the reflected wave in the region Rt, respectively, as a direct wave reach time period and a reflected wave reach time period.

Then, the direct wave reach time period is multiplied by a sound speed c in an underwater positioning range, thereby obtaining a distance I1 from the acoustic transmitter 2 to the hydrophone 3, as expressed by Equation 5.

Similarly, the reflected wave reach time period is multiplied by the sound speed c in the underwater positioning range, thereby obtaining a distance I2 at which the sound wave emitted from the acoustic transmitter 2 is reflected by a boundary to reach the hydrophone 3. A distance d between the hydrophone 3 and a boundary on which the reflected wave is reflected is known.

The coordinate estimation and specification unit 6 solves a simultaneous equation expressed by Equation 27 using a least square method or the like on the basis of the coordinates of the acoustic transmitter 2, the distance d between the acoustic transmitter 2 and the boundary, and the distances I1 and I2, to specify an underwater position, i.e., the coordinates (Xr, Yr, Zs) of the hydrophone 3.

[Equation 27]

$$\begin{cases} (X_t - X_r)^2 + (Y_t - Y_r)^2 = l_1^2 \\ (X_t - X_r)^2 + \{(Y_t - 2d) - Y_r\}^2 = l_2^2 \end{cases} \quad (27)$$

Thus, the underwater positioning system 1 according to the present invention is an underwater positioning system, in which at least one among at least one acoustic transmitter 2 and at least one hydrophone 3 is provided at known coordinates and which positions an unknown point having unknown coordinates at which another acoustic transmitter 2 or hydrophone 3 is provided, being configured to include a time window DB 4 that stores in advance, when the unknown point is set in a plurality of regions R set by dividing an underwater positioning range, a time window for a sound wave emitted from the acoustic transmitter 2 to reach the hydrophone 3 for each of the regions R and a coordinate estimation and specification unit 6 that calculates for each of the regions R a time window-applied impulse response as an inner product of the time window and an impulse response of a sound wave propagation path from the acoustic transmitter 2 to the hydrophone 3 and estimates that the unknown point is located in the region R where the energy of a time window-applied impulse response is maximized.

This configuration makes it possible to estimate the region R where the acoustic transmitter 2 or the hydrophone 3 provided at the unknown point is located with high accuracy by taking the inner product of the impulse response and the time window to exclude the unintended sound wave included in the impulse response and comparing for the regions R the magnitudes of the total energies of the time window-applied impulse responses.

The underwater positioning system 1 is configured such that the coordinate estimation and specification unit 6 specifies the coordinates of the unknown point in the estimated region R on the basis of the peak reach time period of the time window-applied impulse response.

This configuration makes it possible to accurately specify the coordinates of the unknown point in the region R by multiplying the peak time period of the time window-applied impulse response in the estimated region R by the sound wave and calculating a distance from the known point to the unknown point.

The underwater positioning method according to the present invention is an underwater positioning method, in which at least one among at least one acoustic transmitter 2 and at least one hydrophone 3 is provided at known coordinates and which positions an unknown point having unknown coordinates at which another acoustic transmitter or hydrophone 3 is provided, being configured to include the step of storing in advance, when the unknown point is set in a plurality of regions R set by dividing an underwater positioning range, a time window for a sound wave emitted from the acoustic transmitter 2 to reach the hydrophone 3 in a time window DB 4 for each of the regions, the step of the hydrophone 3 receiving the sound wave emitted from the acoustic transmitter 2, and the step of a coordinate estimation and specification unit 6 calculating for each of the regions R a time window-applied impulse response as an inner product of the time window and an impulse response of a sound wave propagation path from the acoustic transmitter 2 to the hydrophone 3 and estimating that the unknown point is located in the region R where the energy of the time window-applied impulse response is maximized.

This configuration makes it possible to estimate the region R where the acoustic transmitter 2 or the hydrophone 3 provided at the unknown point is located with high accuracy by taking the inner product of the impulse response and the time window to exclude the unintended sound wave included in the impulse response and comparing for the regions R the magnitudes of the total energies of the time window-applied impulse responses.

It should be understood that various modifications can be made in addition to the above-described configurations without departing from the spirit of the prevent invention and the present invention covers the modifications.

REFERENCE SIGNS LIST

1: underwater positioning system
2: acoustic transmitter
2*a*: amplifier
3: hydrophone
3*a*: amplifier
4: time window DB
5: signal generation unit
6: coordinate estimation and specification unit
7: D/A converter
8: A/D converter
R, Rt, Rt1, Rt2: region

What is claimed is:

1. An underwater positioning system, in which at least one known location acoustic transmitter and at least one known location hydrophone is provided at known coordinates and which positions an unknown point having unknown coordinates at which an unknown location acoustic transmitter or an unknown location hydrophone is provided, the underwater positioning system comprising:

a database that stores in advance, when the unknown point is set in each region of a plurality of regions set by dividing an underwater positioning range, a time window for a sound wave emitted from the at least one known location acoustic transmitter to reach the at least one known location hydrophone for each region of the plurality of regions; and a coordinate estimation unit comprising a computer programmed to calculate for each region of the plurality of regions a time window-applied impulse response as an inner product of the time window and an impulse response of a sound wave propagation path from the at least one known location acoustic transmitter to the unknown location hydrophone and estimates that the unknown point is located in one of the plurality of regions where an energy of the time window-applied impulse response is a maximum relative to an energy of each of the time window-applied impulse responses calculated for each region of the plurality of regions.

2. The underwater positioning system according to claim 1, further comprising a coordinate specification unit comprising a computer programed to specify coordinates of the unknown point in the estimated region on the basis of a peak reach time period of the time window-applied impulse response.

3. The underwater positioning system according to claim 1, wherein the time window is a time range including a direct wave reach time period in a case where one of the at least one known location acoustic transmitter is located closest to one of the at least one known location hydrophone in each region of the plurality of regions and a direct wave reach time period in a case where one of the at least one known location acoustic transmitter is located farthest from the one of the at least one known location hydrophone in each region of the plurality of regions.

4. The underwater positioning system according to claim 1, wherein the sound wave is a pulse signal or a modulated signal.

5. The underwater positioning system according to claim 1, wherein the underwater positioning range includes a plurality of first regions and a plurality of second regions set by dividing each one of the plurality of first regions, the database stores the time window for each one of the plurality of first regions and each one of the plurality of second regions, and the coordinate estimation unit estimates, on the basis of a time window-applied impulse response for each one of the plurality of first regions, an estimated first region where the unknown point is located and estimates an estimated second region where the unknown point is located on the basis of a time window-applied impulse response for each one of the plurality of second regions in the estimated first region.

6. The underwater positioning system according to claim 2, wherein the time window is a time range including a direct wave reach time period in a case where one of the at least one known location acoustic transmitter is located closest to one of the at least one known location hydrophone in each region of the plurality of regions and a direct wave reach time period in a case where one of the at least one known location acoustic transmitter is located farthest from the one of the at least one known location hydrophone in each region of the plurality of regions.

7. The underwater positioning system according to claim 2, wherein the sound wave is a pulse signal or a modulated signal.

8. The underwater positioning system according to claim 3, wherein the sound wave is a pulse signal or a modulated signal.

9. The underwater positioning system according to claim 2, wherein the underwater positioning region includes a plurality of first regions and a plurality of second regions set by dividing each one of the plurality of first regions, the database stores the time window for each one of the first regions and the second regions, and the coordinate estimation unit estimates, on the basis of a time window-applied impulse response for each one of the plurality of first regions, an estimated first region where the unknown point is located and estimates an estimated second region where the unknown point is located on the basis of a time window-applied impulse response for each one of the plurality of second regions in the estimated first region.

10. The underwater positioning system according to claim 3, wherein the underwater positioning range includes a plurality of first regions and a plurality of second regions set by dividing each one of the plurality of first regions, the database stores the time window for each one of the plurality of first regions and each one of the plurality of second regions, and the coordinate estimation unit estimates, on the basis of a time window-applied impulse response for each one of the plurality of first regions, an estimated first region where the unknown point is located and estimates an estimated second region where the unknown point is located on the basis of a time window-applied impulse response for each one of the plurality of second regions in the estimated first region.

11. The underwater positioning system according to claim 4, wherein the underwater positioning range includes a plurality of first regions and a plurality of second regions set by dividing each one of the plurality of first regions, the database stores the time window for each one of the plurality of first regions and each one of the plurality of second regions, and the coordinate estimation unit estimates, on the basis of a time window-applied impulse response for each one of the plurality of first regions, an estimated first region where the unknown point is located and estimates an estimated second region where the unknown point is located on the basis of a time window-applied impulse response for each one of the plurality of second regions in the estimated first region.

12. An underwater positioning method, in which at least one known location acoustic transmitter and at least one known location hydrophone is provided at known coordinates and which positions an unknown point having unknown coordinates at which an unknown location acoustic transmitter or an unknown location hydrophone is provided, the underwater positioning method comprising the following steps:

storing in advance, when the unknown point is set in each region of a plurality of regions set by dividing an underwater positioning range, a time window for a sound wave emitted from the at least one known location acoustic transmitter to reach the at least one known location hydrophone in a database for each region of the plurality of regions;

receiving the sound wave emitted from the at least one known location acoustic transmitter with the at least one known location hydrophone; and calculating for each region of the plurality of regions a time window-applied impulse response as an inner product of the time window and an impulse response of a sound wave propagation path from the at least one known location acoustic transmitter to the unknown location hydrophone and estimating that the unknown point is located in one of the plurality of regions where an energy of the time window-applied impulse response is a maximum relative to an energy of each of the time window-applied impulse responses calculated for each region of the plurality of regions.

* * * * *